United States Patent [19]

Annas

[11] 3,996,417

[45] Dec. 7, 1976

[54] CABLE CORE GRIP, ELECTRICAL CABLE AND CONNECTOR ASSEMBLY, AND ELECTRICAL CONNECTOR KIT

[75] Inventor: Nick S. Annas, Massena, N.Y.

[73] Assignee: Aluminum Company of America, Pittsburgh, Pa.

[22] Filed: Dec. 8, 1975

[21] Appl. No.: 638,305

Related U.S. Application Data

[63] Continuation of Ser. No. 505,326, Sept. 12, 1974, abandoned.

[52] U.S. Cl. ............................ 174/90; 16/108; 174/79; 174/84 C; 403/278; 403/281; 403/285

[51] Int. Cl.² .................... H01R 5/10; F16G 11/02

[58] Field of Search ............... 174/84 C, 90, 94 R, 174/79; 339/276 R, 276 T, 276 D; 403/274, 285, 174, 284, 276, 278, 281; 16/108, 109

[56] References Cited

UNITED STATES PATENTS

| | | | |
|---|---|---|---|
| 3,065,004 | 11/1962 | Laich | 403/278 |
| 3,184,535 | 5/1965 | Worthington | 174/90 |
| 3,704,048 | 11/1972 | Yoshikawa et al. | 308/72 |

FOREIGN PATENTS OR APPLICATIONS

| | | | |
|---|---|---|---|
| 938,242 | 10/1963 | United Kingdom | 174/90 |

*Primary Examiner*—Laramie E. Askin
*Attorney, Agent, or Firm*—David W. Brownlee

[57] ABSTRACT

A connector is disclosed which includes an electrically conductive compression barrel and a deformable core grip which includes an inner sleeve and three longitudinally extending lobes projecting radially outwardly from the sleeve. The core grip fits over the projecting end of the reinforcing core member in a cable, and the end of the cable with the core grip thereon and a length of the cable with conductor strands thereon fit into the end of the compression barrel which is crimped against the core grip and against the conductor strands. Crimping produces a strong mechanical connection between the core grip and both the cable core contained therein and the surrounding compression barrel, and produces a good electrical connection of the compression barrel to the conductor strands on the cable.

19 Claims, 8 Drawing Figures

CABLE CORE GRIP, ELECTRICAL CABLE AND CONNECTOR ASSEMBLY, AND ELECTRICAL CONNECTOR KIT

CROSS REFERENCE TO RELATED APPLICATION

This is a continuation of United States Ser. No 505,326, filed Sept. 12, 1974, now abandoned.

BACKGROUND OF THE INVENTION

1. Field of Art

This invention relates to electrical connectors and in particular to an electrical connector for core reinforced cables.

2. Brief Description of the Prior Art

High tension electrical cable is commonly constructed with a steel core surrounded by twisted or braided strands of a conductor metal such as aluminum or copper. The conductor strands provide both tensile strength and the necessary electrical conductive path, and the steel core gives the cable additional tensile strength.

In connecting lengths of such cable together or in affixing cable accessories such as dead ends to such cable, a connector must serve the dual purposes of providing a joint of adequate strength and providing an adequate conductive path for electrical current. Meeting these criteria has usually required that the connector be firmly affixed to and in intimate direct contact with both the steel core and the conductor strands. In the field of ACSR (Aluminum Conductor Steel Reinforced) cable, the above criteria have been met by the use of a two-piece assembly comprising an aluminum outer sleeve and a steel inner sleeve. Typically the aluminum sleeve is placed over the free end of one of the cables to be joined and moved along the cable out of the immediate region of joinder. The free ends of both cables are stripped of conductor strands to expose a length of core. These exposed core lengths are disposed in opposite ends of a steel sleeve and the sleeve is then crimped about the contained core lengths. Finally the aluminum sleeve is moved onto the region of joinder, so that the aluminum sleeve extends over the steel sleeve and over equal lengths of cable on either side of the steel sleeve. The aluminum sleeve is then crimped against the conductor strands. Alternatively, a single cable may be joined to the steel sleeve, aluminum sleeve structure in a similar manner but with the opposite end of the joinder structure suitably connected to a cable accessory, such as a dead end.

The design of such steel and aluminum sleeve assemblies is such that a given assembly can accommodate very few cable sizes. This has resulted in a proliferation of various assembly units which a cable accessory manufacturer must make and stock in order to suit the cable sizes which his various customers utilize. Consequently, a specifically designed assembly is usually required for each of the many common ACSR sizes. Additionally, it is not unusual for a particular customer to order cable made to an uncommon or non-standard size cable for a particular application, and this cable will often require a connector assembly designed especially for that cable. This wide proliferation of sizes causes undesirable cost and inventory problems.

The method of application of such assemblies presents additional undesirable aspects to the user. At least two separate crimping operations are required to effect a joint, i.e. the steel sleeve must be crimped against the cable core or cores and then the aluminum sleeve must be crimped against the conductor strands. Since many cable connectors are applied in the field, this two-operation crimping is undesirable in terms of time and equipment. Field crews must have two sets of crimping dies, one for the inner steel sleeve and another for the outer aluminum sleeve. In addition, the initial positioning of the aluminum sleeve on the cable some distance from the free end to allow positioning and crimping of the steel sleeve may be troublesome. Steel core reinforced cable generally acquires a set from the drums on which it is initially wound after manufacture, and the cable will subsequently tend to assume this set or curvature when it is not under tension. Since the cable cannot usually be held in tension at its free end during joining or affixing operations, this curvature will make it difficult to slide the aluminum sleeve along the cable away from the free end. Finally, when such a two-sleeve assembly is used to join two core reinforced cables, the insertion of the exposed cores may occasion some difficulty. Both core lengths are inserted into a common sleeve and this requires at least one of the cables to be manipulated so as to effect insertion because the sleeve will have been positioned over the exposed core of the other cable.

Previous attempts to overcome these problems have been made. For example, U.S. Pat. No. Re. 25,698 discloses a connector which is adapted to be crimped in a single crimping operation in which the outer sleeve is crimped over the inner member and the cable. The inner member, which grips the cable core, is constructed of a frangible powdered metal which fractures upon crimping. As disclosed in the patent, this structure requires a high crimping pressure. This may be troublesome especially in repair as opposed to original installation applications wherein the necessary portability of the crimping press frequently limits the force capability of the press. U.S. Pat. No. 3,125,630 discloses a similar frangible metal ferrule, but comprising a plurality of segments with interlocking fingers. Both patent disclosures appear to contemplate fixing the ferrule in the outer tube and then inserting the exposed core into the ferrule which is fixed in the tube. This means that in joining two cables both exposed cores will have to be inserted into what is essentially a common sleeve with the attendant manipulative difficulties discussed previously. These insertion difficulties are aggravated in the case when the core is made from multiple wire strands. Unless such a core is "preformed" (treated in the manufacture of the cable in such a way as to retain its shape), the individual strands of the core will tend to unravel and splay out when the surrounding strands are stripped away to expose the core at the free end.

The prior art is lacking in a disclosure of a connector for electrical cables in which the same connector is adapted for joining a wide variety of cable sizes using relatively low levels of crimping force. There is no prior teaching of how to avoid the manipulative difficulties of inserting exposed cores of cables to be joined into a common sleeve.

SUMMARY OF THE INVENTION

This invention provides a method and core grip for connecting core reinforced cable to another cable or to a cable accessory. A core grip is provided which secures the cable core to an electrically conductive outer sleeve which is, in turn, directly affixed to the conductor strands of the cable. In joining two core reinforced cables, a core grip is provided for each cable, and after a core grip is positioned over the exposed core at the free end of a cable, the core grip is inserted into one end of a common compression barrel along with a suitable length of immediately adjacent cable. In other joining situations a core grip is provided just for the core reinforced cable and other suitable means is used to affix the cable or desired cable accessory to the compression barrel. The core grip is so designed that when a compression barrel is crimped thereover, the core grip transmits more compressive force than it would if it were a simple right cylinder. The compression barrel is crimped over both the contained core grip or grips and the inserted cable lengths.

The design of the core grip and compression barrel is such that a single set may accommodate a variety of cable sizes. In addition, the design allows a single compression barrel to be used with a number of different sized core grips. Thus with a limited number of sizes the core grip and compression barrel assembly may serve a wide range of electrical cable sizes.

The core grip may be made of any compressible metal, but is preferably made of aluminum or an aluminum alloy. It may conveniently have a configuration such that it can readily be produced by an economical process such as extrusion. Its hoop strength is such that the assembly in which it is incorporated may be crimped by pressures within the capabilities of currently utilized field equipment. Among the objects of this invention is to provide a method and apparatus for interconnecting core reinforced electrical cables which can be readily employed in the field to provide a joint having a tensile strength at least equivalent to 95% of the rated tensile strength of the core reinforced cable. A further object is to provide a joining device which can be economically produced, easily assembled and readily adapted to a variety of cable sizes.

BRIEF DESCRIPTION OF THE DRAWINGS

The above and other objects and advantages of this invention will be more fully understood and appreciated by reference to the following description and the appended drawings in which.

DESCRIPTION OF PREFERRED EMBODIMENTS

Figure 1:
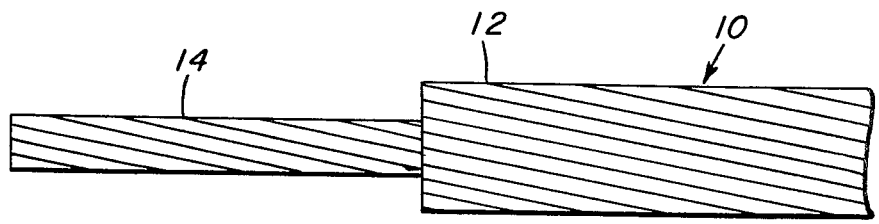
FIG. 1 shows the end of a core reinforced cable suitable to be connected to another cable or to a cable accessory in accordance with this invention.

Referring to the drawings, FIG. 1 illustrates an end of a core reinforced cable 10 which is adapted to be joined to another cable or to a cable accessory employing the present invention. The conductor strands 12 have been stripped from the end of the cable so a length of the core 14 is exposed on the end of the cable with the core projecting some distance beyond the termination of the conductor strands 12 around the core. A sufficient length of the core 14 should be bared or stripped of the outer conductor strands to expose a length of core approximately equal to the length of a core grip which will fit over the cable core as will be hereinafter described. The core 14 of the cable 10 may comprise a plurality of twisted strands as is illustrated in FIG. 1, a plurality of parallel strands or a single core strand. The invention is especially addressed to joining cables having steel core members, which typically have a zinc or aluminum coating thereon to protect them against corrosion, but may also be employed for joining cables having an aluminum core member. This invention is also particularly addressed to joining cables having aluminum conductor strands, but may also be used with cables having copper conductor strands.

Figure 2:
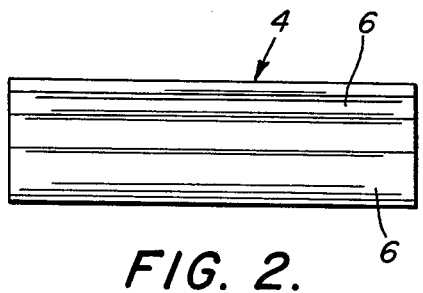
FIG. 2 is a side view of a core grip of this invention.
Figure 3:
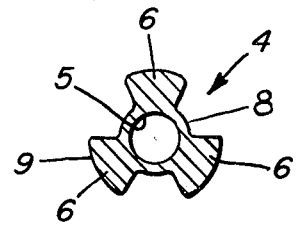
FIG. 3 is a transverse cross-sectional view of the core grip of FIG. 2.

FIGS. 2 and 3 illustrate an exemplary elongate core grip 4 of this invention. The core grip 4 has three longitudinally extending, radially outwardly directed lobes 6 which are integrally interconnected in spaced relationship about a common axis by three deformable webs of metal which, in conjunction with the lobes, form an integral inner sleeve 8. The outer surfaces 9 of the three lobes 6 preferably all lie in a common circle having a diameter which is preferably slightly greater than the outer diameter of the cable 10 wich is to be joined. The inner surface 5 inside the core grip 4 may have an abrasive grit thereon such as aluminum oxide adhered to the surface with varnish or the like. Alternatively, transverse or longitudinal serrations or threads may be formed in the inner surface of the core grip.

Figure 4:
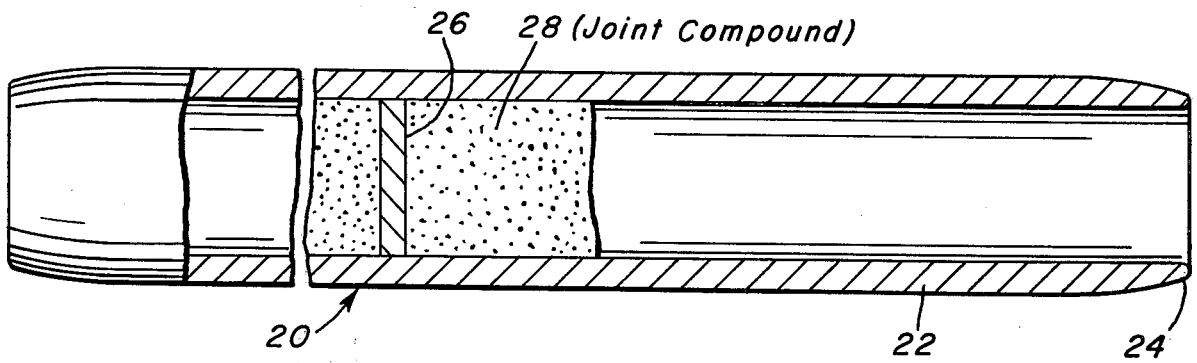
FIG. 4 is a fragmentary side view of a compression barrel of this invention in partial section.

FIG. 4 shows an exemplary compression barrel 20 which is adapted to receive and join the ends of two reinforced cables with core grips thereon. The compression barrel 20 preferably has a length equal to approximately 4 to 5 or more times the length of the core grip 4 and has an internal stop member 26 therein at the center of the barrel. This stop member 26 may be of a variety of constructions such as an aluminum wafer which has been expanded into barrel to lock it in the proper location at the midpoint in the barrel. Joint compound 28 is provided in the compression barrel 20 adjacent the stop member and preferably fills approximately one-fourth of the barrel.

The compression barrel has a substantial wall thickness since it must form both the mechanical and electrical connection between cables or between a cable and a cable accessory. For example, the wall 22 of a compression barrel 20 may have a thickness equal to approximately one-fourth of the internal diameter of the compression barrel. The compression barrel 20 preferably has a tapered end surface 24 on each end thereof which serves to distribute the stresses produced on the conductor strands 12 by the compression barrel when it is crimped against the conductor strands, and reduces the tendency of the conductor strands to fracture or shear at the mouth of the compression barrel 20.

Both the compression barrel 20 and the core grip 4 are constructed of compressible metals or metal alloys, and are preferably formed from aluminum base alloys. The compression barrel 20 is preferably formed from a medium strength, deformable aluminum alloy, and the core grip is preferably formed from a medium to high strength, deformable aluminum alloy. In one exemplary construction, the compression barrel is made of 3003 aluminum alloy (typically by weight, 0.2% Cu, 1.2% Mn, balance Al), and the core grip is made of 6061 aluminum ally (typically by weight 0.6% Si, 0.27% Cu, 10% Mg, 0.20% Cr). In this combination, the 3003 alloy preferably has a hard temper, e.g. H18, and the 6061 alloy preferably has an intermediate to hard temper, e.g. T4 to T6. The alloy and temper designations as used herein are defined in "Aluminum Standards and Data", Third Edition, 1972, published by The Aluminum Association.

As stated above, the compression barrel must have a sufficient length and wall thickness to provide adequate electrical and mechanical strength in the joint to be formed. For many applications, the joint should have a mechanical strength of at least 95% of the rated tensile strength of the cable which is to be joined. In order to provide an adequate interfacial surface area between the compression barrel and the cable and core grips, the compression barrel preferably has a length which is in a range of 4 to 10, and preferably 7½, times its inside diameter.

Figure 5:
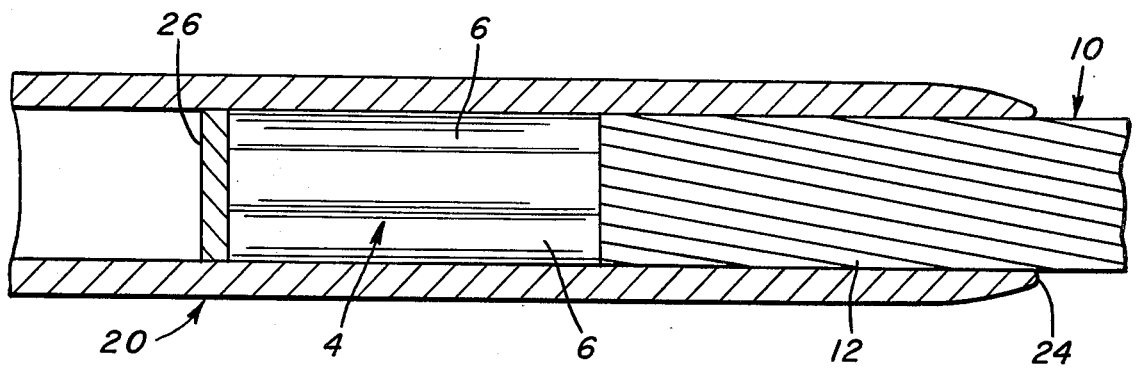
FIG. 5 is a view similar to FIG. 4 and further showing a core grip and cable end disposed in the compression barrel.

FIG. 5 shows a compression barrel 20 with the end of a cable 10 and a core grip 4 disposed in one end of the compression barrel preparatory to crimping the barrel to form a secure joint. The core grip 4 preferably has an outer diameter as measured across the common circle defined by the outer surfaces of the lobes 6, which is only slightly less than the inside diameter of the compression barrel 20. Any excessive clearance between the outer surfaces of the core grip and the inner surface of the compression barrel will mean that part of the crimping action will be used to close this clearance and that less crimping action will be available to compress the walls of the barrel against the core grip, and the core grip against the cable core. It is therefore preferred that there be no more than a 2.5% diametric clearance between the outer surfaces 9 on the core grip and the inner surface of the compression barrel 20. A clearance of between approximately 10% and 40% may exist between the inner bore of the core grip and the core of the cable. A relatively small clearance is desirable because it will produce the most effective and efficient mechanical contact and gripping of the core grip against the conductor core when the assembly is crimped. However, at least a 10% clearance is desired to facilitate insertion of the core into the core grip. Additionally, a single core grip size may be used with a range of conductor sizes so the clearance between the bore of the core grip and the conductor will vary according to conductor size up to approximately a 40% clearance.

Preferably the outer surfaces 9 of the lobes 6 on core 4 are of sufficient total area and configuration that the lobes will not intrude substantially into the wall of the compression barrel 20 upon crimping. For this reason, the outer surfaces 9 of the lobes 6 comprise approximately one-third to two-thirds, and preferably one-half of the circumference of the common circle defined by such surfaces. On the other hand, an adequate circumferential spacing must be maintained between the lobes 6 so that they will not bind against each other as they are driven radially inwardly against a cable core when the compression barrel is crimped against the core grip. The greater the spacing between the lobes, the greater will be the potential for radial inward travel of the lobes against a cable core contained within the core grip. The amount of spacing between lobes which is required will depend upon the diameters of the cores of the cables which are to be joined by a particular core grip. A core grip having a relatively large circumferential spacing between its lobes will accommodate a wider range of core sizes with a given core grip. The lobes are preferably spaced to permit a reduction in the diameter of the bore in the core grip of at least 20% and preferably approximately 50% before the adjacent lobes bind against one another. A reasonable compromise which provides adequate outer surface area 9 on the lobes while also providing adequate space between lobes, is a core grip in which the lobes and the spaces therebetween are approximately equal.

Figure 6:
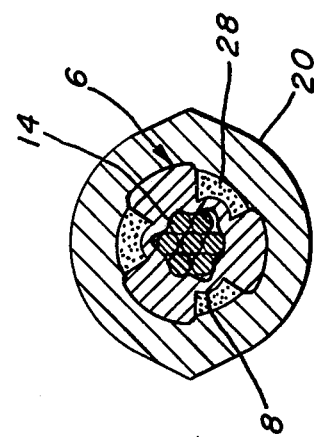
FIG. 6 is a transverse cross-section through a compression barrel, core grip and cable core as crimped into a joint assembly.

FIG. 6 is a cross-section through a connector assembly after crimping with the lobes 6 of the core grip compressed radially inwardly into tight engagement against the outer surfaces of the conductor core 14. The bore of the core grip does not retain its cylindrical shape upon crimping, but instead deforms into a substantially triangular configuration with the webs of metal between the lobes buckled outwardly. The outer surfaces of the lobes 6 of the core grip are partially embedded in the walls of the compression barrel 20 and form a secure mechanical joint therewith. Joint compound 28 substantially fills the spaces between the lobes 6 of the core grip 4.

The core grip 4 is preferably constructed with integral webs of metal therebetween forming continuous sleeve 8 which serves to locate the lobes 6 and also to contain the strands of a multistrand core and prevent them from moving radially outwardly into the spaces between adjacent lobes. If the strands of the cable core were permitted to escape into such spaces, the lobes might not form a tight and secure joint against the core strands. This is especially important in joining core reinforced cable in which the core is not "preformed" or given a permanent set. When the overlying conductor strands are stripped off such a cable to expose the core, the core strands tend to untwist and splay outwardly. The continuous sleeve of a core grip contains these unruly strands and prevents them from slipping outwardly into the spaces between the lobes during crimping.

The webs of metal between the lobes 6 in a preferred embodiment of a core grip 4 of this invention are preferably relatively thin to provide a minimum resistance to buckling during crimping. If the webs are too thick and therefore have substantial strength, much of the crimping force will be utilized in buckling the webs rather than moving the lobes radially inwardly into intimate and secure gripping contact against the core of a cable. The webs of metal between each of the lobes in effect is a column which must be buckled during crimping of a connector assembly. In a preferred embodiment of this invention, the metal thickness in each such web between the adjacent lobes is preferably less than 25% of the arc length of such web so the webs can be deformed using a minimum of the crimping force.

The preferred length of a core grip 4 of this invention is related to the range of core diameters of the cables which are to be joined using such core grip. A shorter core grip can be used when the internal diameter of the core grip is relatively close to the diameter of the core of the cable. However, there is a minimum length of the core grip below which it is virtually impossible to obtain adequate strength in the joint between the core grip and the cable core. For example, in the smaller cable sizes such as a cable having a core diameter of approximately ¼ of an inch, the core grip should be at least 2 inches long even when the internal diameter of the core grip is only slightly larger than the diameter of the cable core. A greater range of cable core sizes can be accommodated with core grips having longer lengths which provide more surface area for gripping the core of the cable. A core grip of this invention preferably has a length which is at least approximately 8 times the internal diameter of the core grip.

In the practice of this invention to join two aluminum conductor steel reinforced (ACSR) cables, the cables are prepared by stripping the conductor strands from the ends of the cables to be joined to expose a length of cable core approximately the length of the core grips to be used. If the cables have non-preformed multistrand cores, the exposed cores inwardly of the terminal end may be temporarily wrapped with tape or the like to prevent them from splaying. A core grip is then slipped over the unwrapped projecting end of a core, and the temporary tape wrapping is removed from the core. The core grip is then further slipped over the core until it abuts against the conductor strands on the cable. Each core grip with a following length of cable approximately equal in length to the core grip is inserted into opposing ends of a compression barrel until the core grips abut against the stop in the middle of the compression barrel. The compression barrel preferably has a joint compound in it to keep moisture and other contamination out of the barrel. When the core grip and cable are inserted into the compression barrel, the joint compound will be exuded around the core grip and cable and may ooze from the end of the compression barrel. The stop member in the compression barrel prevents the joint compound in one end thereof from being pushed into the other end when the cable and core grip are inserted into the barrel. The compression barrel is crimped by commercially available force-operated crimpers having a force in the range of approximately 12–150 tons depending on the size of the connector and the crimping dies. The crimping dies are moved radially inwardly against the outer surface of the compression barrel around substantially its entire circumference. The dies of a compression-operated crimping tool may have a width in a range of approximately one to three inches, again depending on the diameter of the connector and the power of the compressor, and the compression dies are progressively crimped against substantially the entire length of the compression barrel. The compression barrel is preferably crimped commencing approximately at its center and moving progressively outward toward the end thereof. The first bite or crimp is preferably taken adjacent to the inner end of the inserted core grip, but not directly over the center of the stop within the compression barrel to avoid crimping any portion of the compression barrel which may be unsupported by either a core grip or an inserted cable. It is believed that crimping an unsupported barrel portion may cause undue weakening of the barrel.

Figure 7:
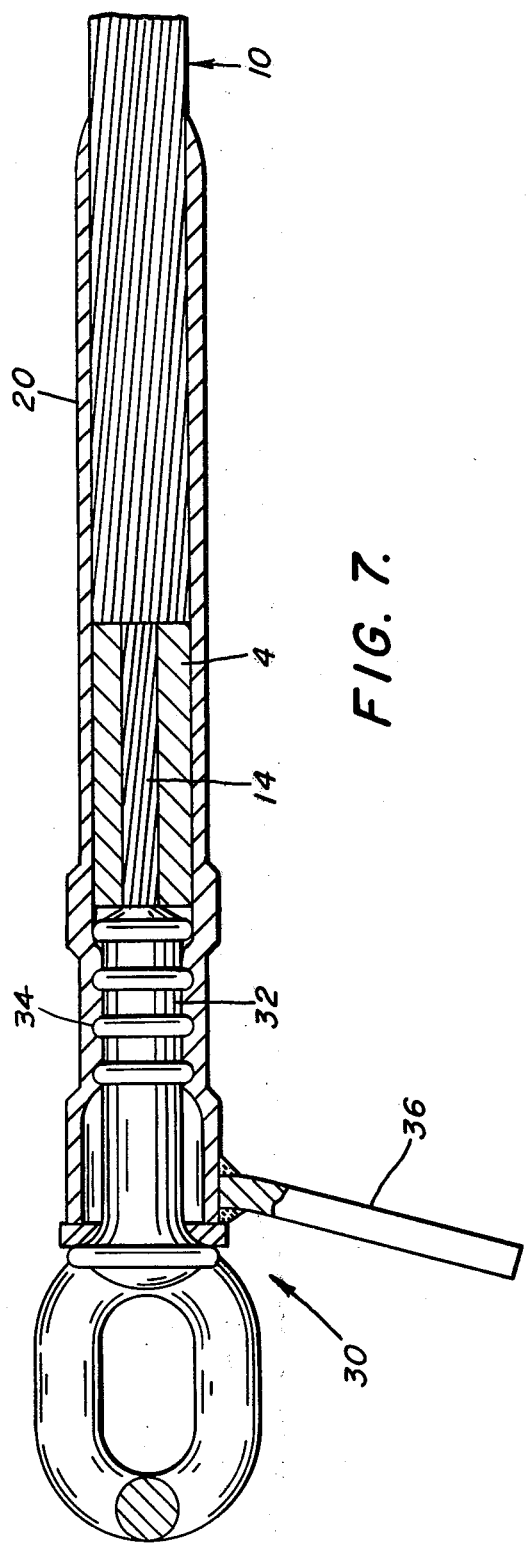
FIG. 7 is a side view in partial section showing a dead end connected to a core reinforced cable using a connector of this invention.

A joint may also be formed between a core reinforced cable and a cable accessory. FIG. 7 shows a connector of this invention connecting a dead end 30 and an ACSR cable 10. The dead end 30 is preferably connected to the connector in the factory or shop by crimping the compression barrel 20 inwardly against the corrugated surface or ribs 34 on the shank 32 of the eye of the dead end, and the tongue 36 of the dead end is welded to the outer surface of the compression barrel. This construction differs from existing steel sleeve-aluminum sleeve constructions in that the load-bearing eye of the dead end may be directly affixed to the compression barrel without the need for other mechanical connections between the eye and the cable core. This construction is possible because the compression barrel is designed to support a load equal to at least 95% of the rated tensile strength of the cable. The connector assembly is attached to a cable in the field in a manner similar to that described in the preceding paragraph.

Figure 8:
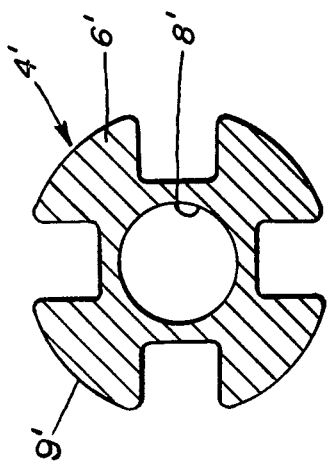
FIG. 8 is a transverse cross-sectional view of an alternative embodiment of a core grip of this invention.

FIG. 8 shows an alternative embodiment of a core grip 4' which can be used in this invention. Core grip 4' has four lobes 6', the outer surfaces 9' of which all lie in a common circle. The opposite lateral edges of the adjacent lobes 6' lie on approximately the same chordal line with webs of metal in the inner sleeve 8' interconnecting the adjacent lobes.

While preferred embodiments of this invention have been illustrated and described, this invention is not limited to such embodiments. For example, the core grip may have any number of lobes thereon and may have a variety of integral connecting means between the adjacent lobes. The connecting webs of metal between the lobes may be discontinuous along the length of the core grip and may be provided only on the opposite ends of such core grip with no connecting web between lobes along the central portion of the core grip. The core grip may also be formed with no connecting web between one pair of adjacent lobes leaving a slot or opening along the entire length of the core grip. However, for convenience and ease of use, the core grip and compression barrel are both preferably symmetrical about their longitudinal axes.

What is claimed is:

1. An elongate core grip of deformable metal adapted to be mechanically joined to the core member in a reinforced cable by crimping a surrounding compression barrel inwardly against the core grip, said core grip comprising a plurality of longitudinally extending radially outwardly projecting lobes of decreasing circumferential extent toward the axis of the core grip, comprising ⅓ to ⅔ of the circumference of the core grip and integrally interconnected in spaced relation about a common axis by a deformable sleeve at the inner edges of the lobes having a central bore therethrough for receiving a projecting length of core from a cable to be connected thereby, said sleeve having a wall thickness less than 25% of the arc length of the sleeve between adjacent lobes to facilitate buckling of the sleeve between the lobes upon crimping of a compression barrel inwardly against the core grip.

2. A core grip as set forth in claim 1 in which the inner surface of said sleeve has an abrasive grit thereon.

3. A core grip as set forth in claim 1 having a length which is approximately eight times the diameter of its central bore.

4. A core grip as set forth in claim 1 which is made of high strength aluminum alloy of intermediate to hard temper.

5. A core grip as set forth in claim 1 which has three lobes thereon.

6. The combination of a cable connector joined to an electrical conductor cable having a reinforcing core therein comprising, an elongate core grip of deformable metal and having a plurality of longitudinally extending radially outwardly projecting lobes integrally interconnected in spaced relation about a common axis by, and projecting radially outward from, webs buckled outwardly between the lobes and having a central bore therethrough with the projecting end of the cable core locked therein by gripping contact between such bore and the outer surface of the cable core, each of said lobes being of decreasing circumferential extent toward the axis of the core grip, and an elongate compression barrel of conductive metal disposed around and compressed against said core grip and against a length of conductor strands on the cable adjacent to the core grip.

7. The combination as set forth in claim 6 in which said core grip is made of medium to high strength aluminum alloy of intermediate to hard temper, and said compression barrel is made of medium strength aluminum conductor alloy of hard temper.

8. The combination of a cable connector joined to an electrical conductor cable having a reinforcing core therein comprising, an elongate core grip of deformable metal and having at least three longitudinally extending radially outwardly projecting lobes integrally interconnected in spaced relation about a common axis by a continuous sleeve at the inner edges of the lobes with the projecting end of the cable core confined and locked in the core grip by gripping contact between the inner surface of said sleeve and the outer surface of such core, and an elongate compression barrel of electrically conductive metal disposed around and compressed against said core grip and against a length of conductor strands on the cable adjacent to the core grip.

9. The combination as set forth in claim 8 in which each of said lobes is of decreasing circumferential extent toward the longitudinal axis of the core grip.

10. The combination as set forth in claim 9 in which each of the lobes has a minimum circumferential extent at its junction with said sleeve.

11. The combination as set forth in claim 8 which includes core grips in opposite ends of the compression barrel with a stop member in the barrel between the core grips.

12. The combination as set forth in claim 8 in which the outer portion of each of said lobes along the length thereof is embedded in the wall of said compression barrel.

13. The combination as set forth in claim 8 in which the wall of said sleeve is buckled outwardly between said lobes.

14. The combination of a cable connector joined to an electrical conductor cable having a reinforcing core therein comprising, an elongate core grip of deformable metal having at least three longitudinally extending radially outwardly projecting lobes thereon integrally interconnected in spaced relation about a common axis by a continuous sleeve at the inner edges of the lobes with the projecting end of the cable core in the said sleeve, and an elongate compression barrel of electrically conductive metal disposed around and compressed against said core grip with the outer portion of each lobe along its length embedded in the wall of the compression barrel and said sleeve collapsed between adjacent lobes which are compressed against the projecting end of the cable core confined in the sleeve, said compression barrel also being compressed in electrical engagement against a length of the conductor strands on the cable adjacent the core grip.

15. An electrical connector kit having component parts capable of being assembled for mechanically and electrically joining two core-reinforced electrical cables or one such cable and an electrical accessory, in which the cable has conductor strands therein wrapped around a reinforcing central core with the conductor strands removed from an end portion of the conductor to expose a projecting length of the core, the kit comprising the combination of:

a hollow cylindrical compression barrel of electrically conductive metal open at both ends and adapted to have an end portion of a conductor inserted in at least one end of the barrel;

at least one elongate core grip of deformable metal adapted to be inserted in one end of the compression barrel along with the end of the conductor, said core grip having an outer extent less than the inside diameter of said compression barrel and comprising a plurality of longitudinally extending lobes in spaced relation about the center axis of the core grip and comprising ⅓ to ⅔ of the circumference of the core grip, said lobes being integrally interconnected by, and projecting radially outwardly from, deformable webs therebetween which, with said lobes, define a bore through the core grip for receiving and confining a projecting length of core from a cable to be joined, each of said connecting webs having a thickness less than its arc length;

whereby said core grip is adapted to be slipped over the projecting end of a core from a cable and the core grip and a length of conductor inserted into the one end of the compression barrel which is adapted to be compressed against said core grip to move the lobes on the core grip radially inwardly against the contained cable core to mechanically lock the compression barrel and core grip on the cable core and the compression barrel additionally crimped against the contained conductor strands to mechanically and electrically join the compression barrel to the conductor strands.

16. A connector kit as set forth in claim 15 in which said core grip has a length approximately eight times the diameter of said bore.

17. A connector kit as set forth in claim 16 in which said core grip has at least three lobes.

18. A connector kit as set forth in claim 15 in which there is diametric clearance between the outer surfaces of said core grip and the inner surface of said compression barrel which is approximately 2.5% of the inside diameter of the compression barrel.

19. A connector kit as set forth in claim 15 in which said compression barrel has a wall thickness of approximately one-quarter its inside diameter.

* * * * *